(12) United States Patent
Akcasu

(10) Patent No.: US 7,975,774 B2
(45) Date of Patent: Jul. 12, 2011

(54) VEHICLE FOR AERIAL DELIVERY OF FIRE RETARDANT

(75) Inventor: Osman Ersed Akcasu, Morgan Hill, CA (US)

(73) Assignee: Lonestar Intentions, L.P., Austin, TX (US)

( * ) Notice: Subject to any disclaimer, the term of this patent is extended or adjusted under 35 U.S.C. 154(b) by 231 days.

(21) Appl. No.: 12/210,130

(22) Filed: Sep. 12, 2008

(65) Prior Publication Data

US 2010/0065288 A1    Mar. 18, 2010

(51) Int. Cl.
| | |
|---|---|
| A62C 35/02 | (2006.01) |
| A62C 8/00 | (2006.01) |
| A62C 27/00 | (2006.01) |
| A62C 37/10 | (2006.01) |
| A62C 31/22 | (2006.01) |
| F42B 10/00 | (2006.01) |

(52) U.S. Cl. ............... 169/46; 169/28; 169/36; 169/53; 169/60; 169/70; 244/3.15

(58) Field of Classification Search ............ 169/28, 169/29, 30, 34, 35, 36, 51, 52, 53, 56, 60, 169/61, 62, 66, 67, 68, 70, 71, 72, 75, 84, 169/46; 244/3.1, 3.11, 3.15, 3.16, 3.18, 3.19, 244/3.2

See application file for complete search history.

(56) References Cited

U.S. PATENT DOCUMENTS

| | | | | |
|---|---|---|---|---|
| 6,056,237 | A  * | 5/2000 | Woodland | 244/3.15 |
| 6,364,026 | B1 * | 4/2002 | Doshay | 169/47 |
| 7,478,680 | B2 * | 1/2009 | Sridharan et al. | 169/36 |
| 2009/0120653 | A1* | 5/2009 | Thomas | 169/61 |
| 2009/0321094 | A1* | 12/2009 | Thomas | 169/70 |

* cited by examiner

*Primary Examiner* — Jason J Boeckmann
*Assistant Examiner* — Ryan Reis
(74) *Attorney, Agent, or Firm* — Kilpatrick Townsend & Stockton LLP; Kenneth R. Allen

(57) ABSTRACT

A guided fire-retardant-containing bomb comprises a container with retractable wings, tail and elevators having the form factor of a conventional release vehicle, where the control surfaces are coupled via a controller to a GPS with inertial guidance control and an ability to receive external instructions, and a charge core to disintegrate and disperse the fire retardant or water.

5 Claims, 3 Drawing Sheets

VEHICLE FOR AERIAL DELIVERY OF FIRE RETARDANT

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

This invention relates to fire fighting technology and particular to aerial fire fighting devices.

Large area fires, such as forest and brush fires, present unique problems in containment and cause devastating effects on the environment, property and wild-life. They can spread quickly and can be difficult to contain and extinguish once they reach a certain size due to the abundance of fuel and oxygen. Since they can start in very remote and inaccessible areas, attacking the fire from the air with "smoke jumpers" and spraying the area with fire retardant chemicals and or water, with specially equipped low flying aircraft and helicopters are commonly practiced fire fighting techniques. These aerial fire-fighting techniques are costly, risky on the fire-fighters and their aircraft and require a specially trained crew with diverse expertise.

A shortcoming of aerial spraying of an area with fire retardant chemicals or water with aircraft is lack of precision in the delivery system. Inaccuracy is basically due to two factors: height and limitations imposed by delivery speed. Due to concern for the safety of the aircraft, fire retardant chemicals or water are sprayed from a low flying aircraft from a height which is much higher than optimum. In addition, when delivered with a relatively high flying speed, they are dispersed to an area far larger than the desired target area so density and thus effectiveness on the target area is often less than optimal. The speed component of the inaccuracy of the delivery process can be somewhat eliminated by using a helicopter for the delivery. Using a bucket hanging from a helicopter with water or fire retardant chemicals has a higher probability of hitting a desired target. However, the amount that can be carried with helicopters is seldom enough to be effective, and it is very risky. In both methods, the lowest altitude of delivery of water or fire retardant chemicals is determined by the height of the flames and constraints imposed by smoke and air currents and safe flying and maneuvering altitude of the delivery aircraft. Local turbulence caused by the fire and the terrain is also factors determining the lowest altitude and speed of the delivery.

Ordnance designed for weapons delivery military applications, such as laser-guided steerable bombs, GPS guided JDAM winged glide bomb and winged missile type vehicles, are not suitable for firefighting applications because the wings are intended for minimal control and thus provide only a small target footprint for the vehicle. Moreover, the JDAM vehicles are not provided with any sort of interactive control system that would permit timed, coordinated targeting of multiple delivery vehicles in a target region.

What is needed is a more efficient and safer delivery system is needed for fighting fires.

SUMMARY OF THE INVENTION

According to the invention, a guided aerial fire-retardant-containing delivery vehicle (smart water bomb) is provided for delivery of water or fire retardant chemicals precisely to a target. This smart water bomb is a winged container made of low-cost materials and has a small explosive charge core that can be detonated at any desired height to disperse a desired area in a desired pattern with water or fire retardant chemicals. The guidance system employs a low-cost combination of GPS and inertial navigation elements and interactive communication with a standoff control capability. To be compatible with the standard release mechanisms of aircraft, it is configured to be between 1,000 and 2,000 lbs. in weight and to fit to the standard fighter-bomber hard points and or in the bomb bay of heavy bombers such as a B-52. It is equipped with small but adequate retractable wings and tail assembly sufficient to provide limited lift and full maneuverability without stalling and to respond to guidance commands to place itself at a selected GPS coordinate within a footprint in time and space.

In a specific embodiment, the container is constructed of fiberglass with wings having an anti-stall airfoil, preferably of strong, lightweight material such as carbon fiber, with CDMA communication and GPS interfaced via a servo controller with an inertial guidance system that manages the movable control surfaces. The wings are pivotally mounted behind the center of mass to simplify the control requirements by maximizing inherent stability, an important consideration in a turbulent atmosphere, such as in the presence of updrafts of a blazing fire. The anti-stall airfoil is preferably a straight wing with a lower surface having two sections between the leading and trailing edge, the trailing section having a lower angle of attack than the leading section so that the stall characteristics are soft.

Since a single 1,000 lb or even 2,000 lb dose of water or fire retardant chemical is not enough to put out a large or medium fire, many of the "smart water bombs" may be used in large numbers and in a coordinated manner, as for example in a system for aerial delivery of fire retardant described in a patent application filed currently herewith in the name of the present inventor.

The invention will be better understood by reference to the following detailed description in connection with the accompanying drawings.

DETAILED DESCRIPTION OF THE INVENTION

Figure 1:
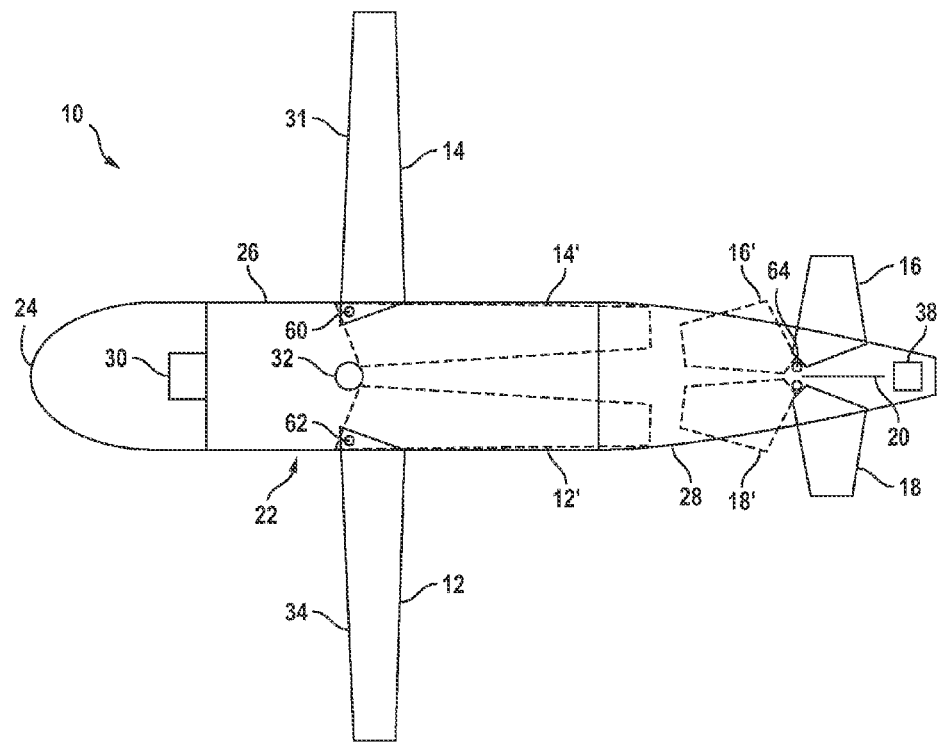
FIG. 1 is a top view of a guided aerial fire-retardant-containing delivery vehicle according to the invention, showing wings and tail in both retracted and deployed positions.

Referring to FIG. 1, there is shown a guided aerial fire-retardant-containing delivery vehicle 10 showing retractable wings 12, 14 and retractable tail segments 16, 18, 20 in both deployed and retracted 12', 14', 16', 18', 20' configurations on a core container 22. The retractable wings 12, 14 are lift generating and generally as large as possible to fit within the constraints of the delivery aircraft, as hereinafter explained. They are also fully tiltable as ailerons. The tail segments 16, 18 are full section elevator elements and with the rudder segments 20 are larger than those of a comparable conventional JDAM-type ordnance to provide better guidance and control. The core container 22 comprises a nose section 24, a mid-section 26 and a tail section 28. The weight and the geometry of a guided aerial fire-retardant-containing delivery vehicle 10 or "smart water bomb" is preferably compatible with the standard 1,000 lb or 2,000 lb gravity bombs used by military ordnance delivery vehicles in order to take advantage of availability of standard fighter bombers and heavy bombers with no modification as transport vehicles.

In this disclosure a 2,000 lb "smart water bomb" is described, more specifically a 1466 kg vehicle, although alternative sizes and configurations are within the contemplation of the invention. A compatible airfoil for the container 22, includes the wings 12', 14' and tail elements 16', 18', 20' in retracted configuration with nose 24, mid 26 and tail 28 sections having a weight distributed as $1/18$ tail, $7/18$ mid and $10/18$ nose. Thus, the tail section 28 is one-tenth the density of the nose 24 and one seventh the density of the mid-section 26, according to the invention.

The wings 12, 14 are a critical and major limitation of the vehicle, making it possible to optimize range and accuracy of delivery in a turbulent atmosphere of a wide-area raging fire. To this end, the wings 12, 14 pivotably mounted to the container 22 at a point behind the center of mass 32, such that the leading edges 34, 31 do not project forward of the center of mass 32 of the fully loaded (filled) container 22. A control module 38 may be mounted at any convenient location, such as in the tail section 28.

FIG. 1 shows the typical 2,000 lb "smart water bomb" according to the invention. It has, in addition to retractable wings 12, 14 that also serve as ailerons, a tail assembly as full motion elevators 16, 18 and rudder 20, an explosive core 30 which is controlled to detonate at a preselected height to disintegrate the container and disperse the fire retardant according to a predetermined pattern. The mechanics include a spring or a servo motor arrangement 60, 62, which opens the retractable wings 12, 14 and sets the individual angles of attack for each wing for banking and turning, arrangement 64 for similar controls for the rudder 20 and the elevators 16, 18. Typically servo electrical motors (not shown) control the tilt angle of the elevators 16, 18, rudder 20 and aileron wings 12, 14 for controlled flight. (Optionally separate aileron control surfaces may be provided in the trailing edge of each wing.)

Figure 4:
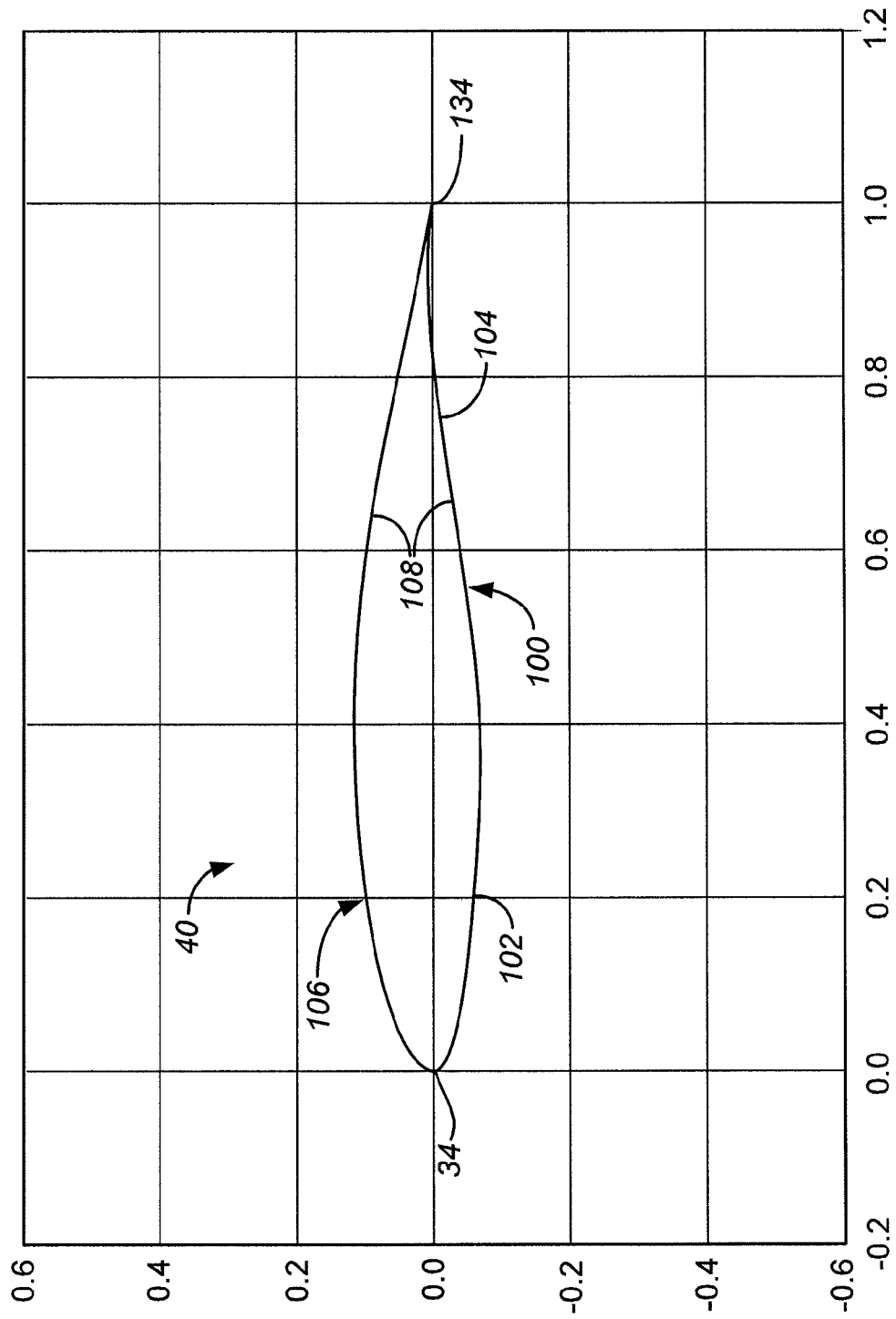
FIG. 4 is a diagram of a Type FX-184 preferred wing airfoil according to the invention.

Referring to FIG. 1 and FIG. 4, the airfoil 40 of the wings 12, 14 is an anti-stall airfoil and preferably a straight wing with a lower surface 100 having two sections 102, 104 between the leading edge 34 and the trailing edge 134, the trailing section 104 having a lower angle of attack than the leading section 102 so that the stall characteristics are soft and stalling occurs with a smooth transition. The top surface 106 may a convex profile with greatest curvature toward the leading edge 34 to optimize lift. A type FX61-184 standard wing airfoil 108 (FIG. 4, shown to scale) best approximates the preferred embodiment of the airfoil 104.

For this application, the retractable wings do not need to be longer than 1.5 meters each. However, longer wings (up to 2.1 meters), permit greater lateral control and thus a larger target footprint. For an initial estimate, calculating dynamics with a simple model of a cambered, straight wing set for an air speed of 400 km/hour for 20 degrees of attack angle yields approximately 12,000 to 3,700 Newtons of lift at 0 meter altitude and 10,000 meters altitude, respectively. For 200 km/hour speeds, these lift figures are approximately 2,700 to 1000 Newton at 0 meter altitude and 10,000 meters altitude, respectively. A 2,000-lb delivery vehicle roughly corresponds to 10,000 Newtons of weight. Thus at sea level, the lift at 200 km/hour speeds is approximately one third of the total weight. However, using a cambered and asymmetric airfoil 40, such as airfoil type FX 61-184 as described in connection with FIG. 2, improves the lift/weight ratio of the aircraft with a desired much more forgiving stall characteristics.

For forest and brush fires, the guidance technology best suited is a "drop and forget" GPS guidance scheme with inertial control. Since a large number of "smart water bombs" may be released in a short amount of time to be effective against forest and brush fires, "smart bomb" technology that requires individual remote control of each smart bomb such as TV, laser, infrared guidance systems is not suitable. In addition, targeting and guidance of other types of smart bombs are not easy, if not impossible, due to very large amount of smoke generated by fire in the target area. The drop zone for the "smart water bombs" to hit their selected GPS target coordinates is a function of the altitude and the velocity of drop as well as the aerodynamic characteristics of the "smart water bomb" itself. Once released from the calculated drop zone they can hit their designated GPS coordinates with an accuracy of several tens of feet.

The control system includes a GPS unit, an inertial navigation unit, air speed probe, a communication unit and a guidance computer to control flight based on the desired GPS coordinate of the target, a pre-programmed flight trajectory to the target and actual position coordinates sensed by the GPS unit and the inertial navigation unit during the flight. Since cost is a major issue, the inertial navigation system is based on off-the-shelf solid-state accelerometers rather than rotating gyros.

Since many of these "smart water bombs" may be dropped simultaneously or with short time intervals between releases from the same plane or many planes that can be in a close proximity formation, collision between the "smart water bombs" is possible. To avoid this, pre-programmed flight trajectory data is fed to all "smart water bombs" such that they do not intersect individually before their release. The pre-programmed flight trajectory cannot be arbitrary: it has to satisfy the ballistics and aerodynamic characteristics of the "smart water bombs." As can be understood, this requires a relatively complex computer program to set the trajectory or the flight plan which satisfies the equation of motion of the "smart water bombs" with an initial spatial coordinates and velocity with the desired target coordinates. One such program is designated "Flight" available through the assignee of the present invention. It is basically a very fast ordinary differential equation solver which calculates the trajectory of any three dimensional object taking its aerodynamic and mechanical properties into account with given initial coordinate and velocity vector information.

To maximize the drop zone volume in space and the target footprint, the guided retardant-containing vehicle 10 is provided with more wing and control surface area than is found in weapons-type standoff JDAM vehicles. Conventional JDAM vehicles have only controllable fins such as elevators and rudders but no lift-generating wings, which limits its drop zone volume and target footprint. When the bomb according to the invention is released from its transport aircraft, typically moving at high speed (approximately 400 km/hr), the retractable wings 12, 14 and the tail elements 16, 18, 20 are deployed, and the internal control system guides itself using its aileron, rudder and elevator surfaces to hit its programmed GPS coordinate target. Having lift-generating retractable wings as large as possible, which nevertheless fit into the side of the container, and since the drop vehicle may be a bomber or a fighter bomber flying at a non-zero air and ground speed with some time intervals between releases, the aerodynamic capabilities and independent controllability of the devices must be such to allow all to achieve the same target coordinate if dropped higher than a reasonable but predictable altitude and within an extended release window in time and space.

Figure 2:
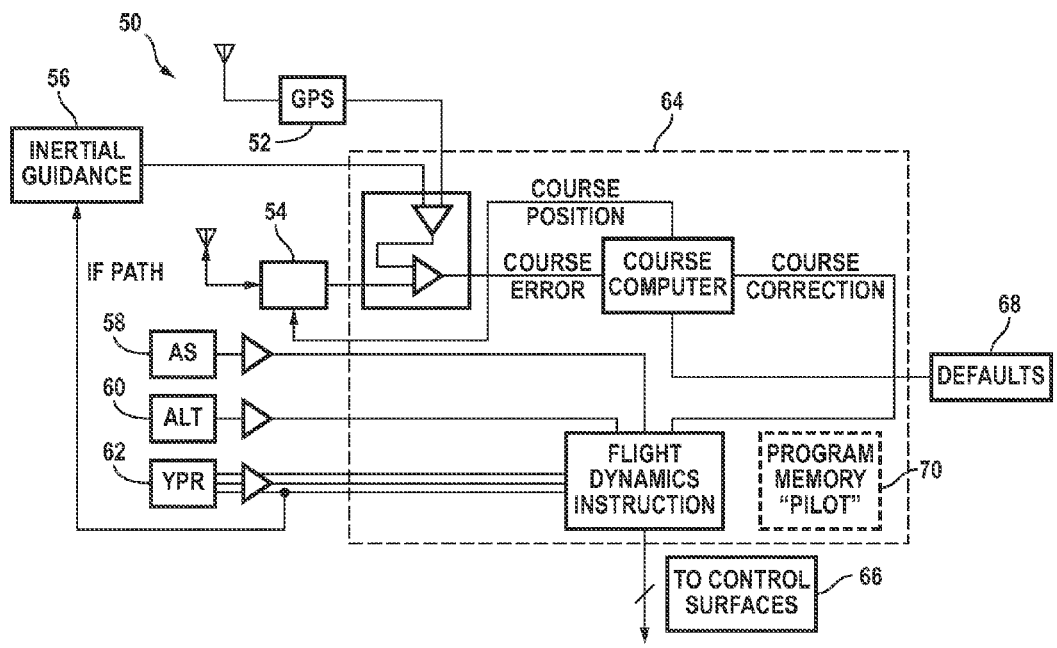
FIG. 2 is a block diagram of the control system for the guided aerial vehicle according to the invention.

Referring to FIG. 2, a control system 50 is shown for fly-by-wire control comprising a GPS receiver 52 for GPS location, a command receiver 54 for receiving commands from a central controller (not shown), an inertial guidance module 56 for sensing and reporting short-term position, an airspeed sensor 58, an altimeter 60, yaw-pitch-roll sensors 62 (which may be integrated into the inertial guidance module 56), an a processor 64 with outputs to flight control surfaces—wings 12, 14, elevators 16, 18 and rudder 20—and to the detonator 30. The processor 64 is run by software modules that complement such a master control program as "Flight" and take into account the specific flight dynamics of the vehicle. Alternatively, dedicated servo control modules (not shown) may replace some of the control functions of the processor 64. The processor 64 or its equivalent handles at least the following functions: course comparison and course error determination, course position computation and reporting, course correction, flight dynamics input and analysis, and control surface commands. Optionally the detonator 30 may be triggered by the altimeter 60 or directly by the processor 64 based on course position. A program called "Pilot" that runs on an appropriately configured processor from associated program memory 70 is available from OEA International of Morgan Hill, Calif.

"Pilot," the program for the real-time flight control system, is based on a predictor-corrector algorithm that uses a fourth order Runge-Kutta based differential equation solution method in real time. Constant course corrections are needed during the flight to follow a precalculated trajectory and to home on the target based on feedback through the GPS coordinate input that is compared with the precalculated trajectory. Hereafter is the sequence of events that takes place in the deployment.

Pre-Release Phase

Figure 3:
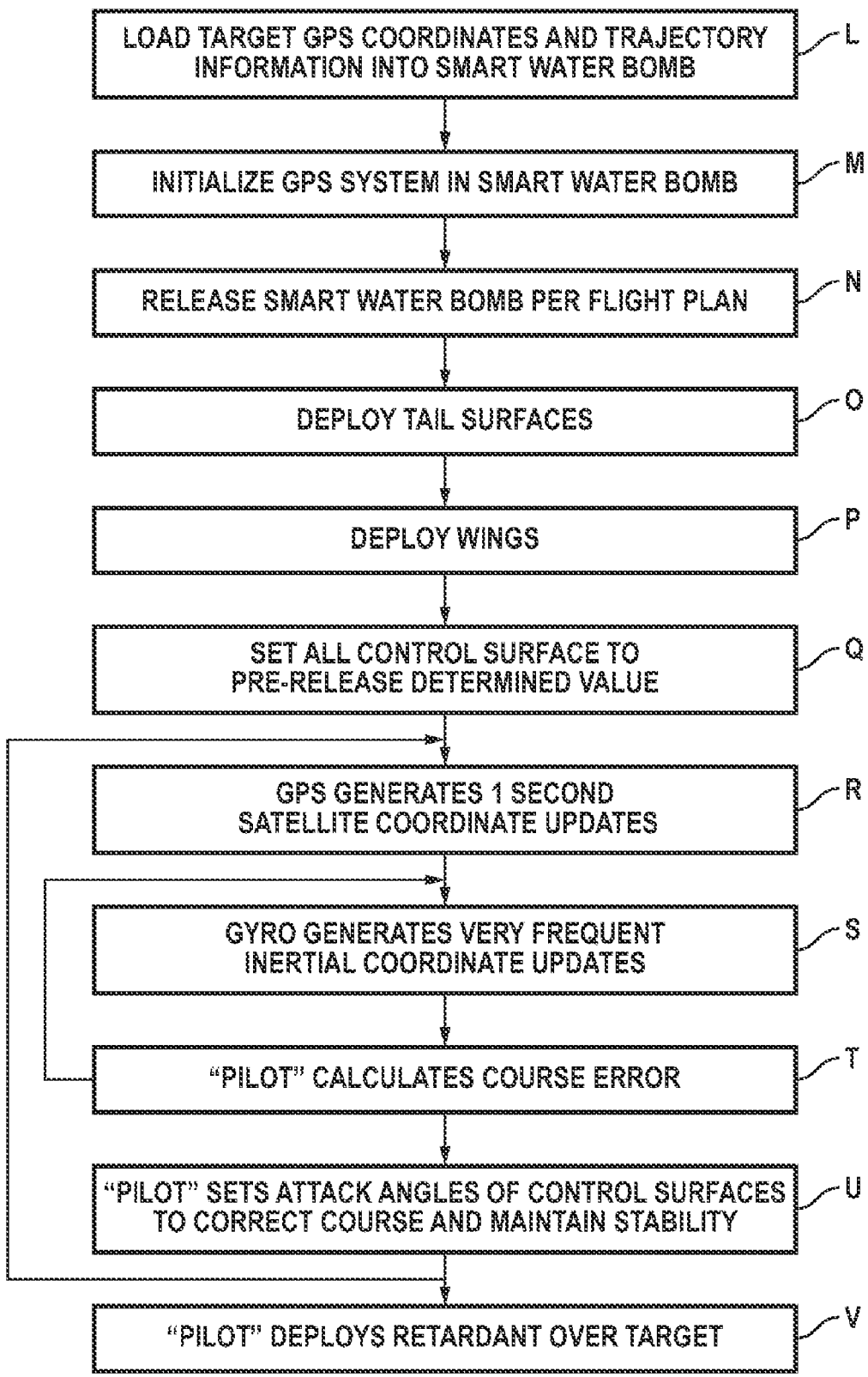
FIG. 3 is a flow chart of a method according to the invention.

The pre-release phase takes place in the drop aircraft. Referring to FIG. 3, the target GPS coordinates and the approximate trajectory information are loaded into the guidance computer of the smart water bombs (Step L). This is done using the two-way wireless communication system between the delivery aircraft (not shown) and its smart water bombs while still on board. GPS systems must also initialize (Step M), which takes time, on the order of 300 seconds to about 15 seconds for off-the-shelf systems, depending on the initialization conditions. After this initialization phase, which is used to acquire the satellite information to be used for navigation, the GPS system 52 can give coordinate information every second. Since the initialization time for the GPS system 52 is almost on the order of the duration of an entire flight time, it must be done before release. Moreover, smart water bombs are carried in the fuselage or under the wings of the delivery aircraft, which can make the reception of the GPS signal inadequate. Therefore, the initial satellite tracking information, heading, velocity and initial coordinate information are constantly supplied to the smart water bombs by its delivery aircraft before release.

Release Phase

In the release phase, the smart water bomb 10 is released from the drop aircraft (Step N). First, the retractable tail control surfaces 16, 18, 20 are deployed with 0 degrees angles with respect to the fuselage axes (Step O). Since the smart water bomb 10 is designed as a nose heavy glider, it will slightly nose dive. After it drops approximately 50 meters, the retractable wings 12, 14 are deployed (Step P). This whole phase takes on the order of 4 to 8 seconds. Then the control surfaces 12, 14, 16, 18, 20 will be set to the pre-release-determined values as they have been calculated in drop zone process (Step Q). The on-board GPS system 52, which was initialized by the drop aircraft before release, starts giving coordinate, velocity and heading information with time intervals of a second (Step R). The three axis gyro data for the pitch, yaw and roll angles along with air speed and all of the control surface angle data from the encoders 58, 60, 62 attached to them starts feeding the onboard "Pilot" navigation system 70 with a much higher rate than the GPS coordinate data (Step S). "Pilot" will always control the directional stability of the smart water bomb 10 and maintains elevator attack angles such that the wing attack angle is always kept at a given value. This does not require frequent GPS information other than in the calculation of the trajectory, so it is a standard negative feedback control system.

Aiming Phase

The trajectory of the smart water bomb 10 can be calculated with initial coordinate and velocity information with the control surface data as a function of time by an offline program. To limit the number of possible simulations to a manageable number, only a few wing attack angles are specified to be continuously controlled by the elevators 16, 18 to maintain a constant wing attack angle with respect to the airflow, or in other words trajectory. At every GPS coordinate update, which is on the order of one per second, "Pilot" calculates trajectories from that coordinate with the initial values of the velocity components in increments of 0.5 degrees between the negative to positive stall angles of the wing and elevators (Step T). This yields maximum of 40 fourth-order Runge-Kutta simulations in the "Pilot." From the set of the simulations, "Pilot" selects the best wing attack angle θ by doing linear interpolation between two trajectories giving closest impact coordinates to the target (Step U). The wing attack angle is maintained at θ until the next correction point by continuously controlling the needed elevator angle. The same process is repeated for every GPS coordinate update, until the "Pilot" senses altitude and position over the target, whereupon it deploys the fire retardant by triggering the small charge 32 that disintegrates the smart water bomb 10 over the target surface (Step V or E).

This method is effective, but it is not unconditionally convergent. Convergence criteria can be mathematically derived and be proven by simulations. It can be shown however, that the method is convergent if the maximum time between corrections is less than a critical value which is determined by the maximum error in range prediction and the selected trajectory itself. The method of finding the convergence criterion is similar to that which has been explained in the inventor's published paper: O. E. Akcasu, "Convergence Properties of Newton's Method for the Solution of Semiconductor Carrier Transport Equations and Hybrid Solution Techniques for Multidimensional Simulation of VLSI Devices," *Solid-State Electronics* Vol. 27, pp. 319-328, April 1984.

Since simulation programs, and in particular the "Flight" program, are not perfect, some empirical approximations in the aerodynamic model of the smart water bomb are useful. In addition, air velocity and density are also not known for all the coordinates of the trajectory during flight. This will result in errors in predicting the wing attack angle needed to hit the target from long distances and will reduce the duration of the time interval between corrections if the method is to remain convergent. The methods for convergence can be improved greatly by making local corrections to the predicted wing attack angles. First, always assume there is an error in the predicted trajectory that increases with time. This assumption is valid and straightforward and can be derived by using the Taylor expansion of a continuous function in the neighborhood of t. In other words the predicted trajectory is more accurate for shorter times, or in the vicinity of t. So one can check the accuracy of the predicted trajectory between wing attack angle correction points, which are the shortest time intervals that can be used for this purpose in the control algorithm that occur during flight.

Assume at time $t_i$, $\theta_i$ is the predicted wing attack angle using the embedded "Flight" program in the "Pilot" guidance control program to hit the target. The next time discretization point is given as $$t_{i+1} = t_i + \Delta t \quad (1)$$

Due to the uncertainties of the wind velocity and the imperfections in the physical and aerodynamic model, the trajectory coordinate errors at $t_{i+1}$ in three dimensions can be represented as $$\Delta x = x_{i+1} - x^a_{i+1} \quad (2)$$

$$\Delta y = y_{i+1} - y^a_{i+1} \quad (3)$$

and $$\Delta z = z_{i+1} - z^a_{i+1} \quad (4)$$

where $x^a_{i+1}$, $y^a_{i+1}$ and $z^a_{i+1}$ are the actual trajectory coordinates obtained from the GPS system and $x_{i+1}$, $y_{i+1}$ and $z_{i+1}$ are the predicted coordinates by maintaining $\theta_i$ attack angle of the wing with respect to the trajectory during the time duration of $\Delta t$.

In addition, the GPS system 52 can also give the velocity errors by comparing the actual versus simulated velocities at time $t_{i+1}$. For the sake of explaining the aiming algorithm in its simplest form, assume that the only non-zero error is in the altitude $z_{i+1}$, which is represented by $\Delta z$. From the set of Runge-Kutta simulations done at time $t_i$ where the $\theta_i$ was calculated to hit the target, the trajectory that passes from the actual $z^a_{i+1}$ at $t_{i+1}$ is selected. At this point a similar interpolation is also needed as done for the calculation of $\theta_i$. The corresponding wing attack angle to the selected trajectory is represented by $\theta^c_{i+1}$. At the same time, at time $t_{i+1}$, $\theta^p_{i+1}$ is calculated which uses the actual $x^a_{i+1}$, $y^a_{i+1}$, $z^a_{i+1}$, $V^a_{xi+1}$, $V^a_{yi+1}$ and $V^a_{zi+1}$ information from the family of Runge-Kutta simulations to hit the target. Since there was an error of $\Delta z$ for the duration of flying time of $\Delta t$, the $\theta^p_{i+1}$ is corrected using the calculated $\theta^c_{i+1}$ value simply by proportionality as $$\theta_{i+1} = k\theta^p_{i+1} \quad (5)$$

where k is $$k = \theta_i / \theta^c_{i+1} \quad (6)$$

As can be seen, if $\theta_i = \theta^c_{i+1}$, there was no trajectory error for the flight duration of $\Delta t$, giving k=1 and no correction is necessary on $\theta^p_{i+1}$.

This control algorithm is very easily adaptable as software in the "Pilot" for accurate aiming of the smart water bombs. The algorithm repeats itself for every $\Delta t$ in the flight.

The convergence property of the method can be tested with a large number of Monte Carlo simulations. In the Monte Carlo analysis, the disturbances such as wind velocity, errors in GPS data and physical parameters of the smart water bombs are analyzed to predict the probability of hitting a target with a given dimensions.

The same algorithm can be used for the directional control of the smart water bombs. Instead of controlling the elevator, the control system will generate rudder, aileron and elevator control signals.

Control Hardware

To implement the control algorithm explained above efficiently and cheaply, an integrated circuit may be provided that is basically a Runge-Kutta solver engine. Since "Pilot" uses on the order of 40 Runge-Kutta simulations to predict the trajectories of the smart water bombs from each time sample to impact, which all have to complete in a fraction of $\Delta t$, parallelization of the Runge-Kutta algorithm is very useful. This will reduce the entire control system to a single chip and will result in cost and space savings along with increased reliability. Basically the chip will have three axes accelerometer inputs, GPS data as inputs and will have wing and corresponding elevator angle, rudder and aileron angles for each time sample as an output. An additional serial port to load the Runge-Kutta parameters related to the physical model of the smart water bombs—and some other program control data—makes this a fairly low pin count chip.

Numerous advantage of a guided bomb according to the invention will be evident. Since the wild fires spread quickly, fast response is crucial. The system and the vehicles used in the system are designed for this. The aircraft for fire fighting roles are specially designed or modified aircraft. They are often converted used aircraft dedicated to firefighting and thus relatively expensive to outfit, requiring specially trained crews and are in limited numbers. Their delivery systems are inaccurate and inefficient. By contrast, "Smart Water Bomb" technology allows standard fighter-bombers or bombers, which already exist in large numbers in the air force or Air National Guard to be deployed with no modification for a fire fighting role. This allows a very concentrated fire fighting capability in much larger numbers of aircraft to be assembled on short notice with a very high precision delivery of water or fire retardants anywhere. To increase the number of aircraft, the outdated aircraft from operational use of the air force can also be employed.

By taking advantage of all weather, day or night capabilities of existing aircraft for fire fighting, the fire fighting capability is greatly expanded. Air Force and Air National Guard will be more motivated to engage in this type of role, which could be beneficial for their training Wild fire fighting manpower and rapid response equipment is increased in a very short time by a very large multiplier by just building and stockpiling "smart water bombs".

The invention has been explained with reference to specific embodiments. Other embodiments will be evident to those of ordinary skill in the art therefore, it is not intended that this invention be limited, except as defined by the claims.

What is claimed is:

1. A guided fire-retardant-containing delivery vehicle for release from an aircraft comprising:
   a container having a shape approximating a conventional air-released vehicle;
   retractable wings, tail and elevators pivotally attached to said container and having movable control surfaces;
   said retractable wings have a chord length less than the chord length of said container, said wings when fully deployed being substantially normal to said container, wherein said retractable wings are pivotably attached to said container at a point behind the center of mass of a filled container in order to simplify requirements of said control system;
each said retractable wing comprising:
an airfoil having a trailing edge, a leading edge, a top surface and a bottom surface, said trailing edge being substantially parallel to said leading edge, said top surface defined by a convex profile between said leading edge and said trailing edge, said bottom surface having a profile between said leading edge and said trailing edge with first section and a second section such that said airfoil promotes a soft stall characteristic of said vehicle in order to maximize gliding flight maneuverability in a turbulent atmosphere;
a core charge for disintegrating said vehicle; and
a control system, said control system including an internal servo controller, a GPS unit, an inertial navigation unit, and a point-to-multipoint-capable two-way communication unit,
wherein the communication unit is configured to receive external instructions and wherein the internal servo controller is coupled to the movable control surfaces, to the GPS unit and to the inertial guidance unit, said internal servo controller being operative to process said external instructions, input from said GPS unit, and input from said internal guidance unit to provide operational commands to said control surfaces in order to guide said delivery vehicle according to a predetermined trajectory to a target, and to detonate the charge core at a predetermined height to disintegrate and disperse the fire retardant; and
wherein said container comprises a nose section, a midsection and a tail section, said container when loaded having a density in said tail section that is one-seventh of density in said mid-section and one-tenth of density in said nose section.

2. The delivery vehicle according to claim 1 wherein said airfoil approximates a type FX 61-184 wing.

3. The delivery vehicle according to claim 2 wherein said retractable wings are pivotably attached to said container at a point behind the center of mass of a filled container in order to simplify requirements of said control system.

4. A guided fire-retardant-containing delivery vehicle for release from an aircraft comprising:
a container having a shape approximating a conventional air-released vehicle;
retractable wings, tail and elevators pivotably attached to said container and having movable control surfaces;
a core charge for disintegrating said vehicle; and
a control system, said control system including an internal servo controller, a GPS unit, an inertial navigation unit, and a point-to-multipoint-capable two-way communication unit,
wherein the communication unit is configured to receive external instructions and wherein the internal servo controller is coupled to the movable control surfaces, to the GPS unit and to the inertial guidance unit, said internal servo controller being operative to process said external instructions, input from said GPS unit, and input from said internal guidance unit to provide operational commands to said control surfaces in order to guide said delivery vehicle according to a predetermined trajectory to a target, and to detonate the charge core at a predetermined height to disintegrate and disperse the fire retardant;

wherein said container comprises a nose section, a midsection and a tail section, said container when loaded having a density in said tail section that is one-seventh of density in said mid-section and one-tenth of density in said nose section.

5. A method for controlling an aerial delivery vehicle to a target comprising:
providing a container for holding a dispersible fire retardant in a sham approximating a conventional air-released vehicle, said container having no propulsion unit;
providing movable control surfaces comprising elevator and tail control surfaces and wing surfaces having sufficient pitch, yaw and roll controllability to provide maneuverability at gliding speeds in a turbulent atmosphere of a fire;
providing a control system for the vehicle, said control system including an internal servo controller, a GPS unit, an inertial navigation unit, and a point-to-multipoint-capable two-way communication unit, said internal servo controller being coupled to the movable control surfaces, to the GPS unit and to the inertial guidance unit,
receiving external instructions via the communication unit to define a trajectory from a current position to the target at a drop zone;
processing said external instructions with said internal servo controller with input from said GPS unit and input from said internal navigation unit to provide operational commands to said control surfaces in order to guide said delivery vehicle according to the trajectory to the target, and to detonate a charge core at a predetermined altitude to disintegrate the vehicle and disperse the fire retardant;
releasing the vehicle from a drop aircraft with retractable tail control surfaces deployed with 0 degrees angle with respect to fuselage axes;
causing the vehicle to nose dive for a distance; thereafter deploying the retractable wings with control surfaces;
setting the control surfaces to pre-release-determined values as have been calculated for the trajectory;
issuing repeatedly from the GPS unit to the internal servo controller coordinate, velocity and heading information;
collecting at the internal servo controller from the inertial navigation unit three axis gyro data for the pitch, yaw and roll angles along with air speed and all control surface angle data at a higher rate than the GPS coordinate data is issued to maintain wing attack angle at a selected value in the turbulent atmosphere;
calculating at the internal servo control system in substantial real time for each said GPS unit issuing an updated trajectory from a current coordinate to the target as between negative and positive stall angles of the wing and elevator control surfaces;
generating at the servo control system from said calculating a plurality of simulations;
selecting at the servo control system from the simulations a best wing attack angle to minimize stall risk while maintaining the updated trajectory by linear interpolation between two simulation trajectories giving closest impact coordinates to the target;
maintaining wing attack angle until a next correction point by continuously controlling the elevator control surface angle; and
upon sensing arrival at altitude and position over the target, deploying fire retardant by triggering the small charge to disintegrates the vehicle containing the fire retardant.

* * * * *

UNITED STATES PATENT AND TRADEMARK OFFICE
CERTIFICATE OF CORRECTION

PATENT NO.        : 7,975,774 B2
APPLICATION NO.   : 12/210130
DATED             : July 12, 2011
INVENTOR(S)       : Osman Ersed Akcasu It is certified that error appears in the above-identified patent and that said Letters Patent is hereby corrected as shown below:

Title Page

In paragraph (73) of the above-referenced Letters Patent, the Assignee's name contains a typographical error as follows:

(73) Assignee: Lonestar Intentions, L.P., Austin, TX (US)

The correct name of the Assignee should read:

(73) Assignee: Lonestar Inventions, L.P., Austin, TX (US)

Signed and Sealed this
Twenty-third Day of August, 2011

David J. Kappos
*Director of the United States Patent and Trademark Office*